(12) United States Patent
Ohnstad et al.

(10) Patent No.: US 7,614,347 B2
(45) Date of Patent: Nov. 10, 2009

(54) SOLID-FUEL-COMBUSTION FIRE-INSULATION INTERFACE WITH ADJACENT CONTAINER-WALL

(76) Inventors: Thomas S. Ohnstad, 4668 Independence Dr., SE., Salem, OR (US) 97223; Michael R. Dennis, 50900 W. Dike Rd., Scappoose, OR (US) 97056; Russell A. Monk, 220 Culver La. South, Salem, OR (US) 97302

( * ) Notice: Subject to any disclaimer, the term of this patent is extended or adjusted under 35 U.S.C. 154(b) by 212 days.

(21) Appl. No.: 11/545,001

(22) Filed: Oct. 8, 2006

(65) Prior Publication Data

US 2007/0084198 A1 Apr. 19, 2007

Related U.S. Application Data

(60) Provisional application No. 60/726,288, filed on Oct. 13, 2005.

(51) Int. Cl.
*F42B 15/34* (2006.01)
(52) U.S. Cl. .................. 102/374; 89/1.8; 89/1.82; 60/253
(58) Field of Classification Search ............ 60/253, 60/255; 102/347, 374; 89/1.8, 1.82
See application file for complete search history.

(56) References Cited

U.S. PATENT DOCUMENTS

| | | | |
|---|---|---|---|
| 2,699,407 A * | 1/1955 | Martens et al. ............. 428/331 |
| 3,461,191 A * | 8/1969 | Dale ........................... 264/41 |
| 3,726,829 A | 4/1973 | Sayles | |
| 4,116,131 A * | 9/1978 | Shafer et al. ................. 60/255 |
| 4,218,502 A | 8/1980 | Graham et al. | |
| 4,273,879 A | 6/1981 | Langer et al. | |
| 4,352,851 A | 10/1982 | Heitz et al. | |
| 4,492,779 A | 1/1985 | Junior et al. | |
| 4,552,070 A | 11/1985 | Langer | |
| 4,588,510 A * | 5/1986 | Salyer et al. ................. 252/5 |
| 4,599,369 A | 7/1986 | Malcolm-Brown | |
| 4,632,865 A * | 12/1986 | Tzur ....................... 428/304.4 |

(Continued)

FOREIGN PATENT DOCUMENTS

JP 1273703 11/1989

OTHER PUBLICATIONS

Weil, E.D. Date unknown. "Meeting FR Goals Using Polymer Additive Systems" *Improved Fire-and Smoke-Resistant Materials*, pp. 129-150. Publisher unknown.

*Primary Examiner*—Bret Hayes
(74) *Attorney, Agent, or Firm*—Jon M. Dickinson, PC; Robert D. Varitz, PC

(57) ABSTRACT

A solid-fuel rocket assembly including an elongate fuel container having a long axis, and an inner surface spaced outwardly from, and generally circumsurrounding, that axis, and a continuous, elastomeric, heat-insulative, intumescence-behavior jacket adhered to the container's inner surface and defining a central chamber for receiving an elongate body of solid fuel. This structure implements a method for minimizing, in a solid-fuel rocket, heat damage to the wall of a solid-fuel container during burning of contained solid fuel including the steps of (a) producing dual-interface, continuous-presence, heat-insulative barriering in the zone existing between the container and burning fuel, with such barriering being characterized by (1) interfacially following any heat-produced deformations in the container wall, and (2) interfacially confronting the burning fuel with a tendency for intumescence-driven barrier-thickening.

7 Claims, 1 Drawing Sheet

U.S. PATENT DOCUMENTS

| | | | | |
|---|---|---|---|---|
| 4,784,902 A * | 11/1988 | Crompton | ................... | 442/373 |
| 4,952,615 A | 8/1990 | Welna | | |
| 5,372,846 A * | 12/1994 | Feldman et al. | ............. | 427/224 |
| 5,531,256 A | 7/1996 | Hashimoto et al. | | |
| 5,821,284 A | 10/1998 | Graham et al. | | |
| 6,486,233 B1 * | 11/2002 | Wong et al. | ................. | 523/179 |
| 6,692,655 B1 * | 2/2004 | Martins et al. | ............. | 149/19.5 |
| 6,783,799 B1 * | 8/2004 | Goodson | ................... | 427/140 |
| 6,855,401 B2 * | 2/2005 | Taylor et al. | ................ | 428/212 |
| 2002/0119717 A1 * | 8/2002 | Taylor et al. | ................. | 442/19 |
| 2003/0003306 A1 * | 1/2003 | Wong et al. | ................. | 428/413 |
| 2003/0220417 A1 | 11/2003 | Guillot et al. | | |
| 2004/0122153 A1 * | 6/2004 | Guo et al. | ................... | 524/430 |
| 2004/0147634 A1 * | 7/2004 | Wong et al. | ................. | 523/179 |
| 2005/0070666 A1 * | 3/2005 | Martin | ...................... | 525/191 |
| 2005/0171242 A1 * | 8/2005 | Taylor et al. | ................ | 523/179 |
| 2006/0145018 A1 * | 7/2006 | Rutan | ..................... | 244/171.1 |

\* cited by examiner

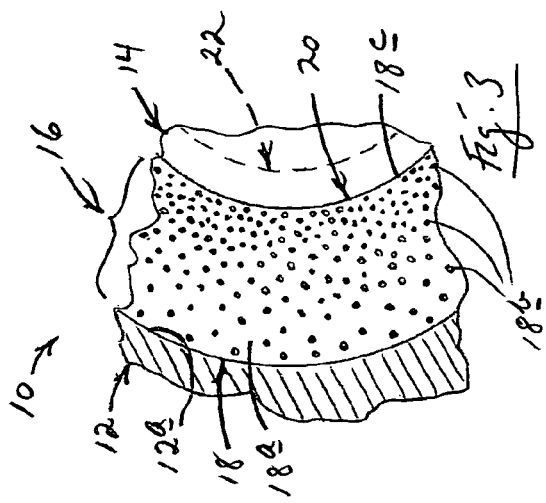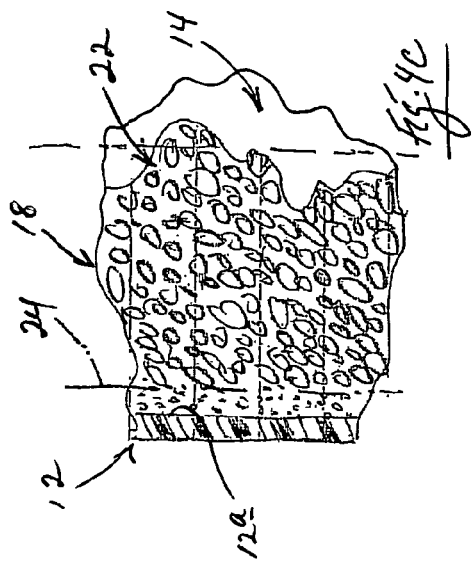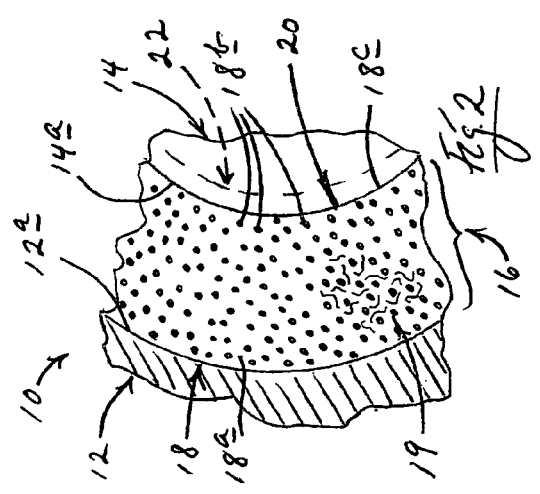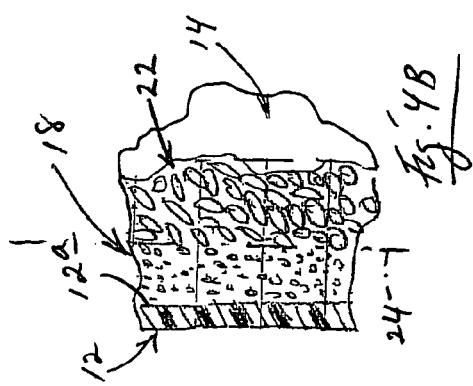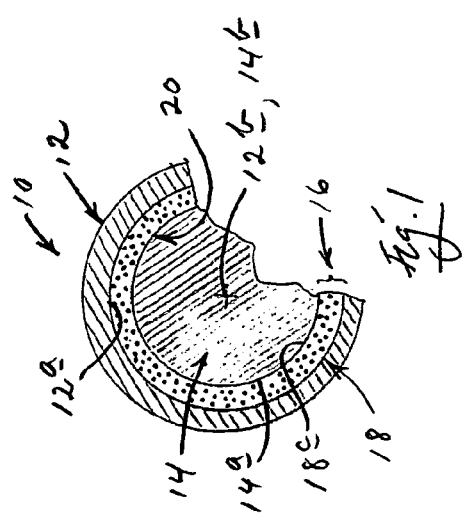

SOLID-FUEL-COMBUSTION FIRE-INSULATION INTERFACE WITH ADJACENT CONTAINER-WALL

CROSS REFERENCE TO RELATED APPLICATION

This application claims priority to currently pending, prior-filed U.S. Provisional Patent Application Ser. No. 60/726,288, filed Oct. 13, 2005, for "Solid-Fuel-Combustion Fire-Insulation Interface With Adjacent Container Wall". The entire disclosure content of that prior-filed provisional application is hereby incorporated herein by reference.

BACKGROUND AND SUMMARY OF THE INVENTION

This invention relates to the provision of an elastomeric and intumescence interface which is capable of providing fire insulation between a combusting solid fuel material and a nearby wall of a container which is holding this material. A preferred embodiment of the invention is described herein in conjunction with such an interface, and with the creation of such an interface, which exists between solid fuel which is used in a rocket, and the surrounding wall, typically the rocket wall itself, which contains this fuel.

There are certain situations, such as the one set forth generally above with respect to a solid-fuel rocket, wherein an interface or a zone of proximity exists between a solid combustible fuel material which is combusting during a rocket launch, and a container wall for that material which needs to be protected against fire damage and potentially catastrophic destruction during such fuel combustion.

In the field of solid-fuel rockets, it is apparently a conventional practice to line the inside wall of a solid fuel-containing compartment with an elastomeric sheet material interface which is referred to, and functions, as an ablative material. Such sheet material is typically installed the form of in pre-defined-outline sheets (i.e., sheets with defined lateral edges), bonded to the inside surface of the subject wall which is to be protected, with obvious seams existing where the edges of adjacent sheets come together. Experience over the years in this setting has been decorated with a number of catastrophic failures where, during solid-fuel combustion, the intended protective sheet-layer which lies between the combusting fuel and the nearby containing wall fails for one reason or another, perhaps because of seam failure (i.e., seam opening, and resultant exposure of the container wall to the extraordinary heat of fuel combustion).

The present invention provides a resolution to this issue by furnishing a special elastomeric coating which may be sprayed into place as one continuous coating which offers no seams for breaching, and which responds with intumescence behavior (a material-swelling behavior) in response to exposure to high heat, such as fuel combustion. This intumescence heat-response behavior acts quickly, effectively and elastomerically to insulate a protected wall from the intense combustion heat, such as that which is experienced during launch in and of a solid fuel rocket. No coating/layer seams exist to open, and the coating, which follows natural wall expansion with sympathetic, elastomeric coating expansion, also grows progressively in thickness, by way of intumescence behavior, to distance the high-heat fuel-combustion zone from the vulnerable container wall. Various intumescence materials, some of which are mentioned herein, and one of which—sodium silicate—is preferably employed, may be used within the coating of this invention to invoke the desired coating-intumescence behavior.

If desired, the intumescence-armed coating interface of this invention may additionally be strengthened and stabilized by the inclusion in the coating of embedded fibrous contents, such as glass or Kevlar® strands/whiskers.

The various important features and advantages which are offered by the present invention, from both a structural and a methodologic point of view, will now become more fully apparent as the detailed invention description which is presented below is read in conjunction with the accompanying drawings.

DESCRIPTION OF THE DRAWINGS

FIG. 1 is a fragmentary, cross-sectional, axial view of a solid-fuel rocket assembly including a heat-insulative barrier jacket which, in accordance with the present invention, is interposed the inside of a container wall for solid fuel in the assembly, and the solid fuel per se.

FIG. 2 is an enlarged, fragmentary, cross-sectional detail of a portion of the assembly shown in FIG. 1 illustrating details of one form of an insulative jacket material which includes a body of high-elastomeric material in which there is embedded a relative uniformly distributed distribution of intumescence elements. A small region of the jacket material pictured in FIG. 2 is illustrated with included, embedded reinforcing fibres, such as Kevlar®.whiskers.

FIG. 3 is similar to FIG. 2, except that it illustrates a modified form of heat-insulative jacket material, wherein intumescence elements are embedded in a high-elastomeric material with a distributed density gradient, with respect to which a higher distribution density exists near the location of solid rocket fuel, and a lesser distribution density exists more closely adjacent the inner wall of an associated solid fuel container.

FIGS. 4A, 4B and 4C are story-telling drawings that generally illustrate relevant intumescence behavior which characterizes the performance of the invented heat-insulative jacket during burning of rocket fuel.

DETAILED DESCRIPTION OF THE INVENTION

Turning attention now to the drawings, and referring first of all to FIGS. 1 and 2, indicated generally at 10 is a rocket engine, or assembly, which is made in accordance with a preferred embodiment of, and manner of practicing, the present invention. Rocket assembly 10 includes an elongate, cylindrical, rocket-engine container 12 possessing a cylindrical wall having an inner surface 12a which generally equidistantly circumsurrounds the long axis 12b of container 12. Axis 12b extends generally into, and normal to, the plane of FIG. 1 in the drawings.

Disposed generally centrally within container 12, generally centrally aligned with long axis 12b in the container, and possessing a generally cylindrical outer surface 14a, is an elongate, cylindrical body of solid rocket fuel 14 possessing a long axis 14b which is substantially coincident with continuer access 12b.

As is clearly evident in FIGS. 1 and 2, interposed the outer surface of fuel body 14 and the inner surface of container 12 is a zone 16, of nominal spacing between these two structures, in which zone, in accordance with the present invention, there is a generally cylindrical jacket 18 which functions herein as an elastomeric, heat-insulative, continuous-surface, intumescence-behavior barrier jacket, or barrier, between container 12 and fuel 14. As illustrated in FIGS. 1 and 2, jacket 18 includes a high-elastomeric body 18a, and embedded therewithin, a relatively uniform distribution of intumescence elements 18b. Elements 18b herein preferably take the form of sodium silicate crystals. These elements (crystals), when exposed to intense heat, respond with a popping and expanding intumescence behavior. Jacket 18 herein substantially fills zone 16 between container 12 and fuel 14, and may typically have a radial thickness, relative to previously mentioned coincident axes 12b, 14b, of about ½-inches. This jacket is formed to have an elastomeric body produced by a two-part blend of combinable urethane elastomer materials which, after blending, become chemically curable from an initial flowable and very tacky state to a solid-body, high-elastomeric substance. This two-part urethane elastomeric material may be made with different specific starter materials, but one which has been found to be extremely satisfactory is a two-part product made by Rhino Linings, USA in San Diego, Calif., sold under the trademark TUFF STUFF®FR. The distribution of intumescence elements, herein preferably sodium silicate crystals, occupies the total volume of jacket 18 by about 50%, with these crystals having a mesh size of about 100-mesh.

Other kinds of intumescence materials which may be employed include microencapsulated melamine polyphosphates, amorphous silica, microencapsulated ammonium polyphosphates, and expandable graphite.

Additionally, if desired, jacket 18 may be reinforced to deal more tenaciously with intumescence behavior by having an inclusion of fibrous material, such as glass or Kevlar® strands/whiskers, such as the Kevlar® whiskers which are shown in a small region 19 in FIG. 2.

The blended and distributed materials, including any optionally introduced reinforcing fibres, which make up jacket 18 preferably are spray-applied to the inner surface 12a of container 12 to have the jacket features just described, with the outer portion of jacket 18, i. e., that portion of the jacket which is in contact with inner surface 12a, tenaciously bonding during spraying to the container's inner surface. The inner, somewhat cylindrical surface 18c in jacket 18, which surface generally circumsurrounds previously mentioned axes 12b, 14b, effectively defines an elongate cylindrical chamber 20 for receiving solid fuel body 14.

With rocket engine assembly 10 ready for use, when fuel body 14 is ignited, and when intense heat then begins to develop within this fuel, several important mechanisms come into play with respect to the way in which jacket 18 protects cylinder 12 against catastrophic damage. First of all it is extremely important to note that because of the nature of insulative jacket 18, and the fact that this jacket is created by spraying as one continuum, or continuous surface expanse, completely around and along inner surface 12a of cylinder 12, there are no discontinuities, such as those discussed earlier herein, to allow for easy penetration of jacket 18 to attack cylinder-wall integrity. Secondly, any heat-produced mechanical deformation which may take place in the cylinder wall is "followed" immediately by the elastomeric body portion of jacket 18 because of the tenacious bonding which exists between cylinder wall surface 12a and jacket 18 during spray-application of the materials making up jacket 18. A third very important mechanism is that, essentially, that portion of jacket 18 which confronts, and is in contact with, the burning body of solid fuel produces, at the interfacial region between the jacket and the fuel, intumescence behavior which causes, effectively, the overall thickness of the jacket to tend to increase in a manner which thereby tends to drive the source of intense heat more distantly away (i.e., radially inwardly relative to axes 12b, 14b) from inner surface 12a in cylinder 12.

FIGS. 4A, 4B and 4C generally illustrate this important characteristic of intumescence behavior. In FIG. 4A, there is shown a simplified illustration of cylinder 12 and adjoining jacket 18 under circumstances before any heat develops on the solid-fuel facing side (the right side) of jacket 18 in this figure.

When solid fuel 14 begins to burn, and heat becomes generated on the fuel-facing side of jacket 18, this heat causes the sodium silicate crystals embedded within jacket 14 to begin swelling and bursting in a region adjacent the burning fuel, such as is illustrated at 22 generally in FIG. 4B. Illustrated here in a somewhat exaggerated manner is the fact that this region 22, the inner side of which can be thought of as being defined by an intumescence-temperature front represented by dash-dot line 24 in FIG. 4B, has caused the overall radial thickness of jacket 18 to increase. In a way of somewhat simplistically describing this intumescence behavioral feature of jacket 18, and augmenting what was said earlier herein, one can think of front 24 as being a crystal "popping" or "exploding and expanding" front effectively defined by a temperature rise within jacket 18 which is sufficient to cause sodium-silicate crystal-popping expansion.

FIG. 4C in the drawings, which is also an exaggerated illustration, pictures a circumstance somewhat later in time than that pictured in FIG. 4B, and specifically, a time by which front 24 has moved more deeply radially inwardly into jacket 18, with consequent, additional thickening of jacket 18.

One can thus see that there is an important tendency of this intumescence behavior to increase the distance between the region of high, fuel-burning heat and the inner surface 12a of container 12 as fuel combustion continues. Accordingly, elastomeric jacket 18, in relation to its no-discontinuity and thickness-swelling characteristics, is uniquely structured to minimize the likelihood of any catastrophic damage occurring to container 12.

Turning attention finally to FIG. 3 in the drawings, what is shown here is a modified version of jacket 18 in which, as in the case of previously described jacket 18, there is an elastomeric body 18a wherein resides an embedded distribution of sodium silicate intumescence elements 18b. Here, however, elements 18b are distributed within the body of jacket 12 with a non-uniform density, and in particular, with a density gradient whereby the density of these elements is greater in regions located close to fuel 14 than it is in regions of the jacket more closely adjacent container wall surface 12a. A very useful density gradient is one wherein the higher-element-density region near fuel 14 has a density preferably of about 50%-60%, and the lower-element-density region near surface 12a has a density preferably of about 0%-20%.

From a methodologic point of view the invention can be described as a method for minimizing, in a solid-fuel rocket, heat damage to the wall of a solid-fuel, container during burning of contained solid fuel, with this method including the steps of: (a) placing between the container and contained fuel a structurally continuous, heat-insulative barrier having an outer surface which is adhered to the container, and an inner surface which faces the contained solid fuel; and (b) during burning of the contained fuel, utilizing container-wall surface adherence and jacket-material elasticity in the barrier's outer surface to cause that surface to follow any heat-created deformations that occur in the adjacent container, and simultaneously utilizing the barrier's inner surface to confront the burning solid fuel with elastomeric intumescence, barrier-thickening behavior.

Still another way of expressing the present invention from a methodologic point of view is to describe it as a method for minimizing, in a solid-fuel rocket, heat damage to the wall of a solid-fuel container during burning of contained, inwardly spaced, solid fuel, including the steps of: (a) producing dual-interface, continuous-presence, heat-insulative barriering in the zone existing intermediate the container and the burning fuel, with such barriering being characterized by (1) interfacially following any heat-produced deformations in the container, and (2) interfacially confronting the burning fuel with intumescence-driven, elastomeric barrier-thickening.

We claim:

1. A solid-fuel rocket assembly comprising
   an elongate body of solid rocket fuel having a generally central long axis, and an outer surface spaced outwardly from, and generally circumsurrounding, said axis,
   an elongate fuel container having an inner surface spaced outwardly from, and generally circumsurrounding, the fuel body's said outer surface, and
   a continuous, seamless, elastomeric, heat-insulative, intumescence-behavior jacket adhered to said container's said inner surface and generally circumsurrounding said fuel body's said outer surface.

2. The assembly of claim 1, wherein said jacket is formed of a sprayed-in-place, high-elastomeric material including an embedded distribution of sodium silicate intumescence elements.

3. The assembly of claim 2, wherein the embedded distribution of intumescence elements is substantially uniform throughout said jacket.

4. The assembly of claim 2, wherein the embedded distribution of intumescence elements is non-uniform, in the sense of possessing a density gradient which transitions from larger-to-lesser progressing outwardly in the jacket in a direction extending through the jacket from adjacent said fuel body toward said container.

5. The assembly of claim 2, wherein said jacket further includes an embedded distribution of reinforcing fibres.

6. A solid-fuel rocket assembly comprising
   an elongate fuel container having a long axis, and an inner surface spaced from and generally circumsurrounding said axis, and
   a continuous, seamless, elastomeric, heat-insulative, intumescence-behavior jacket (a) adhered to said container's said inner surface, (b) spaced from and generally circumsurrounding said axis, and (c) defining a central chamber for receiving an elongate body of solid rocket fuel.

7. A method for minimizing, in a solid-fuel rocket, heat damage to the wall of a solid-fuel container during burning of contained solid fuel comprising
   placing between the container and contained fuel a structurally continuous, seamless, heat-insulative barrier having an outer surface which is adhered to the container, and an inner surface which faces the contained solid fuel, and
   during burning of the contained fuel, (a) utilizing surface-adherence and material elasticity in the barrier's outer surface to cause that surface to follow any heat-created deformations occurring in the adjacent container wall, and (b) simultaneously utilizing the barrier's inner surface to confront the burning solid fuel with intumescence behavior.

* * * * *